(12) United States Patent
Colle et al.

(10) Patent No.: US 10,592,211 B2
(45) Date of Patent: Mar. 17, 2020

(54) GENERATION OF APPLICATION BEHAVIORS

(71) Applicant: Microsoft Technology Licensing, LLC, Redmond, WA (US)

(72) Inventors: Olivier Colle, Bellevue, WA (US); Yudhvir Singh Chauhan, Redmond, WA (US); Laura Sabina Onu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/866,458

(22) Filed: Jan. 9, 2018

(65) Prior Publication Data
US 2018/0129482 A1 May 10, 2018

Related U.S. Application Data

(63) Continuation of application No. 14/883,526, filed on Oct. 14, 2015, now Pat. No. 9,910,641.

(51) Int. Cl.
*G06F 8/20* (2018.01)
*G06F 8/34* (2018.01)
*G06F 3/0484* (2013.01)
*G06F 3/0482* (2013.01)
*G06F 9/451* (2018.01)
*G06F 8/33* (2018.01)

(52) U.S. Cl.
CPC ............ *G06F 8/20* (2013.01); *G06F 3/0482* (2013.01); *G06F 3/04842* (2013.01); *G06F 8/34* (2013.01); *G06F 8/33* (2013.01); *G06F 9/453* (2018.02)

(58) Field of Classification Search
None
See application file for complete search history.

(56) References Cited

U.S. PATENT DOCUMENTS

| | | | | |
|---|---|---|---|---|
| 5,850,548 | A * | 12/1998 | Williams | G06F 8/34 717/107 |
| 6,918,091 | B2 * | 7/2005 | Leavitt | G06F 3/04817 715/765 |
| 7,536,676 | B2 | 5/2009 | Baker et al. | |
| 7,673,286 | B2 * | 3/2010 | Yuknewicz | G06F 8/38 715/762 |

(Continued)

OTHER PUBLICATIONS

VS2008, "Designing a User Interface (Visual C#)", 2008, Published by Microsoft at https://msdn.microsoft.com/en-us/library/ms173080(v=vs.90).aspx (Year: 2008).*

(Continued)

*Primary Examiner* — Hossain M Morshed

(57) ABSTRACT

Examples of the disclosure provide a system and method for receiving a component at a design surface, the component representing a user interface element of an application. A selection of the component is received and a selection of at least a portion of a first target component is detected. Based on the selection of the first target component, a first property of the first target component is determined to use in an expression, the expression to be dynamically evaluated at runtime of the component. The expression automatically generated to change a property of the component based on the first property of the first target component.

20 Claims, 12 Drawing Sheets

(56) References Cited

U.S. PATENT DOCUMENTS

| | | | |
|---|---|---|---|
| 8,170,901 B2 | 5/2012 | Shukla et al. | |
| 8,578,282 B2* | 11/2013 | Boillot | G06F 8/34 710/9 |
| 8,659,658 B2 | 2/2014 | Vassigh et al. | |
| 8,789,014 B2 | 7/2014 | Robison et al. | |
| 8,843,892 B2 | 9/2014 | Hamlin et al. | |
| 8,862,975 B2 | 10/2014 | Liao et al. | |
| 8,954,870 B2 | 2/2015 | Martin et al. | |
| 9,910,641 B2* | 3/2018 | Colle | G06F 8/20 |
| 2002/0010908 A1* | 1/2002 | Cheng | G06F 8/34 717/106 |
| 2004/0015832 A1* | 1/2004 | Stapp | G06F 8/30 717/106 |
| 2006/0015839 A1 | 1/2006 | Owens et al. | |
| 2008/0092057 A1* | 4/2008 | Monson | G06F 9/451 715/744 |
| 2009/0228841 A1 | 9/2009 | Hildreth | |
| 2010/0153865 A1 | 6/2010 | Barnes et al. | |
| 2011/0302514 A1* | 12/2011 | Rinaudo | G06F 3/04842 715/763 |
| 2012/0030566 A1* | 2/2012 | Victor | G06F 3/0482 715/702 |
| 2012/0102093 A1* | 4/2012 | Sinclair | G06F 17/243 709/203 |
| 2012/0227028 A1* | 9/2012 | Pun | G06F 8/38 717/108 |
| 2014/0006944 A1 | 1/2014 | Selig et al. | |
| 2015/0007130 A1* | 1/2015 | McConville | G06F 3/017 717/106 |
| 2017/0109136 A1* | 4/2017 | Colle | G06F 8/20 |

OTHER PUBLICATIONS

Cheusheva, "Two ways to change background color in Excel based on cell value", 2014, Published by AbleBits, Published at https://www.ablebits.com/office-addins-blog/2013/10/18/change-background-color-excel-based-on-cell-value/ (Year: 2014).*

Delimarschi, "Enabling Integrated Development Environments with Natural User Interface Interactions", 2014, Published by ACM (Year: 2014).*

NetHeaven, "ComboBox Control in VB.Net", 2012, Published at https://www.dotnetheaven.com/article/combobox-control-in-vb.net (Year: 2012).*

Visual Studio 2008 (hereinafter VS2008) Publication Title.: "Designing a User Interface (Visual C#)", 2008, Published by Microsoft, (Year: 2008).*

NetHeaven, article title "ComboBox Control in VB.NET", 2012, posted by VB.NET (Year: 2012).*

"Start Developing iOS Apps: Jump Right In", Retrieved from: «https://developer.apple.com/library/content/referencelibrary/GettingStarted/DevelopiOSAppsSwift/index.html#//apple_ref/doc/uid/TP40011343-CH7-SW1», Retreived on: Sep. 21, 2017 , 3 Pages.

"Designing a User Interface (Visual C#)", Retrieved from: «https://msdn.microsoft.com/en-us/enus/library/ms173080(v=vs.90).aspx», Nov. 16, 2012, 3 Pages.

"Properties Window", Retrieved from: «https://msdn.microsoft.com/enus/library/ms171352(v=vs.90).aspx», Nov. 16, 2012, 2 Pages.

"Welcome to the Notability User Guide", Retrieved from: «https://static1.squarespace.com/static/500757cce4b002842b3270ac/t/5197043ee4b00dab067a0ff7/1368851518228/Notability+user+guide.pdf», Retrieved on: Jul. 16, 2015, 8 Pages.

"Non-Final Office Action Issued in U.S. Appl. No. 14/883,526", dated May 2, 2017, 27 Pages.

Delimarschi, et al., "Enabling Integrated Development Environments with Natural User Interface Interactions", In Proceedings of 22nd International Conference on Program Comprehension, Jun. 2, 2014, pp. 126-129.

Fernandez-Y-Fernandez, et al., "Integrated Development Environment Gesture for Modeling Workflow Diagrams", In Proceedings of International Conference on Research and Innovation in Software Engineering, Apr. 25, 2012, 8 Pages.

"International Search Report and Written Opinion Issued in PCT Application No. PCT/US2016/054576", dated Nov. 21, 2016, 12 Pages.

* cited by examiner

GENERATION OF APPLICATION BEHAVIORS

CROSS-REFERENCE TO RELATED APPLICATIONS

This application is a continuation of U.S. Non-Provisional application Ser. No. 14/883,526, filed Oct. 14, 2015, the entirety of which is hereby incorporated by reference herein.

BACKGROUND

Creating an executable computer program generally involves generating algorithms, verifying the correctness of the algorithms, and implementing the algorithms into a programming language. This process often requires expertise in many areas, including coding in the target programming language. For example, in an Integrated Developer Environment such as MICROSOFT VISUAL STUDIO, a designer exists to create a user interface form for an application. A developer can drag controls to the design surface. To change a property of the control (e.g., to change the size of a textbox, or the color of a shape), the developer typically adds code to an event handler of the control to change the property of the control. Similarly, in GOOGLE ANDROID STUDIO, or ECLIPSE, Java code may be added to change a property of a control at runtime. Despite the fact that designers have existed in these tools for many years, and despite numerous productivity gains of Integrated Developer Environments, the process of adding code to change properties of controls at runtime still often requires developer skills in writing the code that affects the control properties at runtime. In addition, it still often involves developer time, and is subject to errors made by developers in writing code.

Spreadsheet software such as MICROSOFT EXCEL or GOOGLE DOCS have allowed users to create models by specifying transformations between cells using a functional declarative language similar to mathematical models. These functions usually take one or more arguments that may be provided by typing text in a formula bar or by clicking in a cell. However, the only visual elements that participate in the transformation chain, or models, are the spreadsheet cells, such as with features for highlighting participating spreadsheet cells in a sheet. Additionally, a spreadsheet cell holds a single value and does not have other attributes or properties exposed to the model. Because there is only one type of control contributing to the model in a spreadsheet—the cell—and because a cell has only one value being displayed in the cell, there is no concern about linking one property type of one type of design control to another property type of another type of design control, because control attributes are not linked or used in conjunction with formulae.

SUMMARY

Examples of the disclosure provide a system and method for automatically generating an expression used to affect a user interface of an application. Expressions are generated automatically via gestures within the developer environment, such as on the design surface, within a data preview panel or screen preview panels, or within the formula bar itself An expression represents runtime behavior of the application. The expression, representing runtime behavior, may be generated without having to write code. Because the expressions are generated automatically, they are likely to involve less error at generation and at runtime. In addition, because the expressions are generated automatically, they may also be optimized for runtime efficiency. Further, because the expressions are automatically generated, application behaviors may be generated with less intrinsic knowledge of the system, and of coding in general.

Aspects of the disclosure provide a developer environment that any user, regardless of development experience or lack thereof, may utilize to create applications. General workplace computing skills, similar to skills employed when using MICROSOFT OFFICE or similar programs, are translated into a development environment. Because the expressions are generated automatically, they further increase efficiency of a developer or user in development of an application. In addition, the development environment is translated to a non-developer user in such a way as to provide application development for any user, increasing the speed of application development for the user.

For example, a component is received at a design surface, the component representing a user interface element of an application. A selection of the component is received, and a selection of at least a portion of a first target component is detected. Based on the selection of the component, a first property of the first target component is determined for use in the expression. The expression is automatically generated to change a property of the component based on the first property of the first target component. Because the expression is automatically generated from the user selection of components on a design surface, the developer environment consumes less space while providing the same, if not more, user interface functionality.

As just one example, a first control (such as, for example, a slider) may be placed on a design surface while designing an application. A second control (such as a color picker) may be placed on the design surface. When a user selects the slider as a first control, and then selects the color picker as a target control, a property of the color picker (e.g., SelectedColor property) may be used to determine a property of the first control (e.g., FillColor of Slider control). An expression is automatically generated to bind the slider as the first control and the color picker as the target control based on the user selections. At runtime, the selected color of the color picker—the target control—determines the fill color of the slider control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable the creation of application behaviors via gestures. Generating application behavior using code generally requires a knowledge of programming, component capabilities and compatibilities, and so forth. Aspects of the disclosure provide for automatic generation of application behaviors using gestures indicating component selection and component properties based on design context.

Aspects of the disclosure further enable application design as an interactive visual experience. By exposing the function visually as gestures or interactions are detected or received, examples of the disclosure bypass efforts to type in application behavior. Through visually exposing the dynamic expression generation via the interactive design surface and the visual cue generator as a designer receives selections, a user is guided through the application behavior generation process. Further, the visual interaction provided by the interactive design surface improves user efficiency in application design and in creating application behaviors, and provides increased user interaction performance. Additionally, a user may learn how an expression is created from the visual cues provided based on user selection detected through gestures. Further, examples of the disclosure provide for increased processing speed and memory conservation during application design and generation, as well as reduced processor load and operating system resource allocation.

Figure 1:
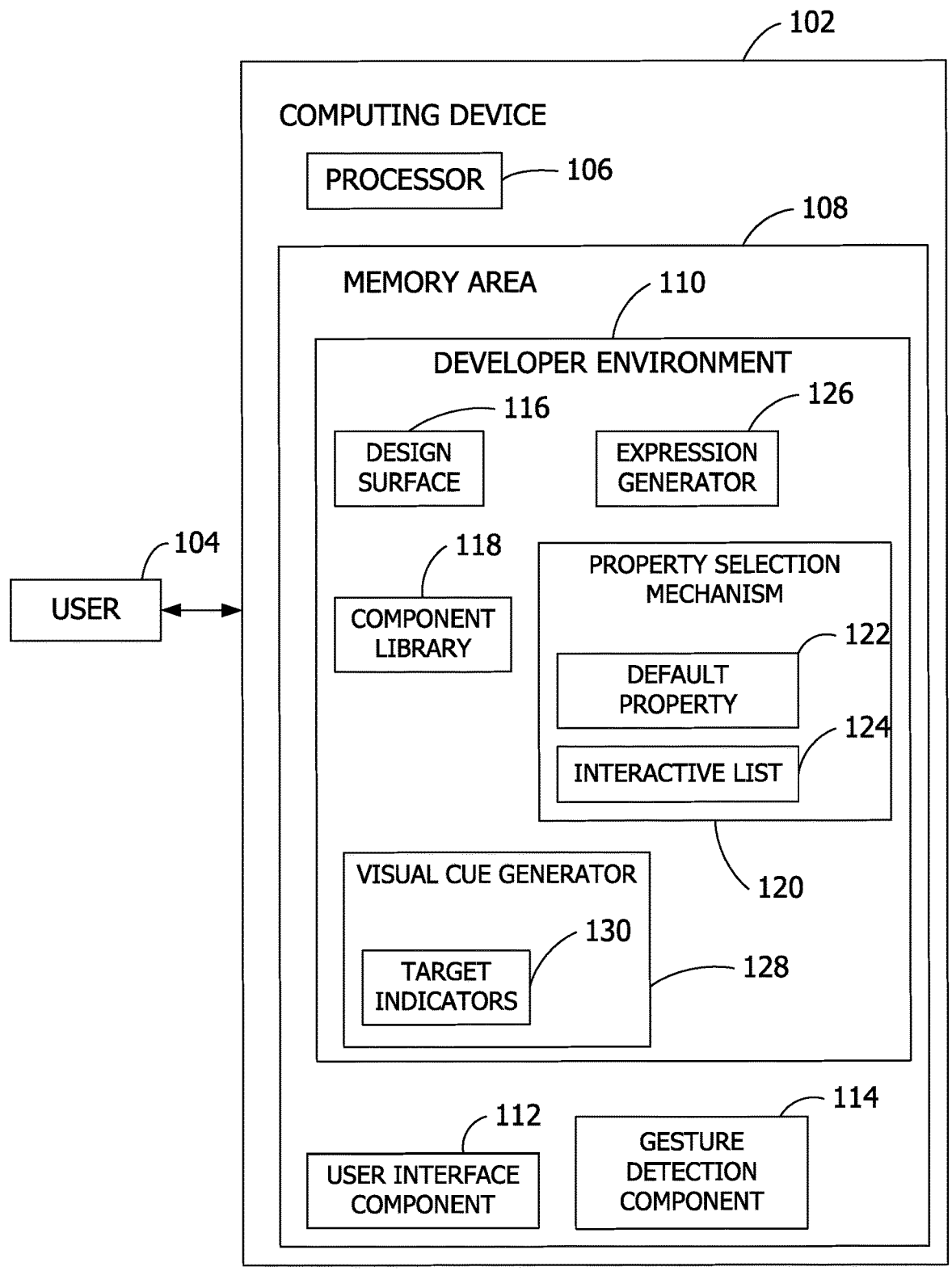
FIG. 1 is an exemplary block diagram illustrating a computing device for generating application behavior.

Referring again to FIG. 1, an exemplary block diagram illustrates a computing device for generating application behavior. In the example of FIG. 1, the computing device 102 associated with a user 104 represents a system for application design. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor 106, a memory area 108, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 3 and FIG. 4).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include application designer 110, which may represent an application for designing other executable applications. The applications may communicate with counterpart applications or services such as web services accessible via a network (not shown). For example, the applications may represent downloaded client-side applications that correspond to server-side services executing in a cloud. In some examples, aspects of the disclosure may generate expression and application behavior at server-side services executing in a cloud based on gestures received at client-side applications. In other examples, application behavior generated at client-side applications may be configured to communicate with data sources and other computing resources in a cloud during runtime, or may share and/or aggregate data between client-side services and cloud services.

The memory area further stores one or more computer-executable components. Exemplary components include a user interface component and a gesture detection component. The user interface component 112, when executed by the processor 106 of computing device 102, cause the processor 106 to perform operations, including to receive user selections during user interaction with developer environment 110, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by a gesture detection component 114 in communication with the user interface component.

Developer environment 110 provides design tools and a design environment for application design and generation.

In some examples, developer environment 110 includes design surface 116, component library 118, visual cue generator 120, property selection mechanism 122, and expression generator 124. Design surface 116 may be an interactive canvas or interactive design surface of developer environment 110. In some examples, design surface 116 is part of an interactive graphical user interface displayed on an interactive computing device. For example, design surface 116 may be an interactive surface communicatively coupled to a gesture detection mechanism, such as gesture detection component 114, such that gestures detected are used to communicate interaction with the application designer, or elements of the developer environment.

Component library 118 may include one or more components, or controls, which may be selected or used in application design. For example, component library 118 may have templated components that may be selected and customized with application behavior via user interaction with design surface 116. Example components may include, without limitation, text controls, gallery controls, visual layout controls, animation controls, navigation controls, labels, and the like. As one example, component library 118 includes a slider control, which is a graphical element that allows for selection of a value by moving an indicator, usually across a bar-type shape. With a slider control, selection of a value is made by selecting a point on the slider bar, or by moving the indicator to a point on the slider bar, with different locations or points along the slider bar associated with different values, in this example. As used herein, component may refer to a control, an object, an entity, or any component that may be used in an application or program.

Property selection mechanism 120 is a component of developer environment 110 that is configured to identify and/or determine control properties, or behaviors, and map properties of some controls to properties of other controls. For example, a control may have a number of properties, such as color, border, text, size, and so forth. Property selection mechanism 120 may identify parameters to use in expressions related to properties of a selected component or set of components, determines default properties of controls, provides an interactive list of component properties, or selects best match properties based on property types of different controls and based on the current scope or context within the expression.

In one embodiment, property selection mechanism 120 may use a mapping schema to identify compatible properties of a target component. In another embodiment, the property selection mechanism may identify the property to map as indicated by a component itself—such as an attribute or metadata of the component specified to indicate a property that can be mapped, and potentially further indicate compatible property types. A component, or control, may have multiple properties, each property having a property type. For example, a slider control may have a Value property with a property type of number, the slider value represented by a number, as well as a Background Color property with a property type of color. In this example, the property selection mechanism 120 may identify and select a property for a target component based on an attribute specified within the target component itself and the current context within the formula.

As one example, a user desires a label that shows the value of a text column displayed in a gallery. The label component has a Label property that is of property type Text. The gallery component has a number of properties, such as rows of data, border color, selection, and so on, each property of a different property type. At design time, in the label property Text formula, a user may click directly on the gallery component, which would automatically modify the formula to have the label component display the value of a text column of a selected row of the gallery component, such as "Gallery!Selected!Col1" for example. At runtime when a user clicks on a different row in the gallery, the label value is updated to show the value—or the text—of the newly selected row. As another example, a user desires the label to show the number of rows in the gallery. The user may type the function COUNTROWS(, which takes a Table property and returns the number of rows in the table. Property selection mechanism 120 expects a table property type in this example, as opposed to a text property type in the previous example, based on the scope or context of the formula. Clicking on the table component at design time binds the table to the gallery, such as COUNTROWS (Table1) for example.

In an exemplary embodiment, an object class may incorporate properties as part of the component, and appropriate properties to map may be determined based on class definition or an aspect within the control. As one example,

```
Class Shape
{
    Color BorderColor
    {
    }
}
Class SliderBar
{
    [DefaultToMap]
    Color FillColor
    {
    }
    Color BorderColor
    {
    }
    String Property2
    {
    }
}
```

Property selection mechanism 120 may identify a corresponding type between a control class "Shape" and a control class "SliderBar" as "Color" and map "Color:FillColor" of "SliderBar" to "Color:BorderColor" of "Shape" in this example. This may be based on a number of factors, such as a match between property types, namely property type "color" in the example above, metadata indicating a default property to map for a control, or where the user clicks on the control itself, for example.

As one example, a slider control is visually composed of a slider, a minimum value, and a maximum value. A user desiring a label that displays the percentage of the slider may click on a label component, which selects the text property of the label by default. The user may then click on the formula bar, which initiates a formula editing mode for the developer environment based on the location of the cursor within the formula bar. A next click on the slider cursor automatically modifies the formula to "Slider1!Value." The user may type "/(", which modifies the formula to "Slider1!Value/(" and a subsequent click on the max value of the slider control modifies the formula to "Slider1!Value/ (Slider1!Max." The user may type "-" at the end of the current formula, then click on the minimum value of the slider control, which modifies the formula to "Slider1!Value/ (Slider1!Max-Slider1!Min." A click outside of the formula bar closes the parenthesis for the formula automatically and ends the formula editing mode.

In some examples, a component may have multiple properties, and one or more of the properties may be of the same property type. For example, a label component may have a text property, a size property, a border property, a fill color property, a border color property, and so on. In this example, the fill color property and the border color property may both be the same property type, namely color. A determination of which property to use for the label component, when multiple properties have the same type, may be based on determining the most relevant property. For example, the most relevant property may be determined based on telemetry statistics, or a machine learning algorithm that accounts for a current user's most frequent usage of properties.

The property selection mechanism 120 determines property selection based on a current design context or scope, which may be evaluated using a number of factors. One such factor may be a cursor location within an expression displayed in a formula bar on the design surface. For example, a user selection, such as a tap, on a target component may automatically generate a first parameter, which is visually displayed in a formula bar on the design surface. A click or tap on the formula bar places the cursor location within the formula bar, which property selection mechanism 120 recognizes as a formula editing mode. The cursor location may specifically be adjacent to the end of the first parameter, such that a next user selection of another target component automatically generates a second parameter associated with the first parameter based on the cursor location, for example. In other words, cursor location within a function, or expression, is used to determine the current property type expected for the current function parameter. Whereas cursor location outside of the formula bar is used to add a function, such as through selection of a component for example, or to terminate the formula editing mode.

Another factor used by property selection mechanism 120 to determine a current context may be a location in the formula or expression where a parameter is inserted or selected for adjustment. A parameter may be highlighted, for example, to select that parameter for adjustment. In other example, a double tap gesture on a parameter may select the parameter. User interaction with a parameter in the formula bar may be used to evaluate a context, or infer user intent with respect to that property of an associated control on the design surface.

Yet another factor used to determine a current context may be recognition of a property match between controls based on property types. For example, if a first property of a selected control, or set of controls, is a type string and a second property of a target control is a type string, property selection mechanism 120 may recognize the first property and the second property as a best match for wiring between the selected control and the target control.

Still another factor used to determine a current context may be a default property of a control. For example, property selection mechanism 120 may determine a default property for a first target control. Based on the default property of the first target control, which is not overridden by another user selection, property selection mechanism 120 may determine a current context for the application design, which may be used to determine a default property of a second target control selected by a user gesture, for example.

Other factors used by property selection mechanism 120 to determine context may include, without limitation, a dynamic property of a control, a learned property of a control, a location within a target control selected or a portion of a target control selected, a repeated gesture, machine learning, telemetry, or any other suitable factor for determining a design context. As one example, a dynamic property of a control may contribute to the determination of a current design context, such as a slider bar having a value property that may dynamically change based on the slider position, or a chart component having properties such as bars, legends, and so forth that may be bound to dynamic data. As another example, a learned property of a control may contribute to obtaining a current context, such as a learned property based on past user interaction or selection with that control type. As yet another example, a location within a target control, or a selected portion of a target control, may impact the evaluation of a current context by virtue of the properties of that location or portion of the target control, and further the properties of that location or portion that are appropriate to map to other controls currently at the design surface.

Property selection mechanism 120 may be part of a design logic of developer environment 110, which is configured to dynamically determine context as user interaction with design surface 116 occurs. For example, design surface 116 may receive a component by having user 104 interact with user interface component 112 to select the component from component library 118 and place the component at design surface 116. Design logic detects a selection of the component received, and uses property selection mechanism 120 to determine a current design context and default property 122 for the selected component based on the current design context. For example, the selection may be through a cursor placement and click via a peripheral device, or a tap via touchscreen, or any other type of gesture detection indicating selection. The gesture triggers an autocomplete for the control being tapped, to generate at least a portion of an expression. The participating property or aspect of the control depends on the context and an expected property type, such as color, number, and so on. The coordinates of the gesture promotes the property that is representative for that region of the design surface.

The default property 122 and an interactive list 124 of properties corresponding to the selected object may be provided by property selection mechanism 120 at design surface 116 in such a way as to visually expose default property 122 and interactive list 124 to user 104. This allows user 104 to see the default property selected by the property selection mechanism, as well as other possible control properties, and select a different property for the selected component from the interactive list 124 based on user intention to adjust or manipulate a different parameter in the expression being dynamically generated by expression generator 126.

Expression generator 126 is part of the design logic of developer environment 110 that converts user interaction at design surface 116 into a formula or expression for application behavior. User interaction at a design surface may be, for example, without limitation, selection of a component, selection of a target component, selection of at least a portion of a target component, default property selection by a property selection mechanism, user selection of a component property, gesture detection via gesture detection component 114, and/or any other suitable user interaction with developer environment 110. As an example, expression generator 126 may detect user selection of a component, and a default property for the component provided by property selection mechanism 120, and automatically provide an initial expression corresponding to the selected component and the default property. The expression may be visually displayed in a formula bar or expression field on the design surface. A subsequent user selection of a target component may adjust, manipulate, or otherwise change the expression displayed in the formula bar as the expression generator dynamically generates the expression based in part on user interaction and context awareness. Expression generator 126 provides the formula for the application behavior desired based on contextualized gestures, such as a tap indicating selection of a component, or a swipe indicating wiring in an animation effect to a control, for example. In this way, application behaviors may be generated using gestures, by expression generator 126 interpreting those gestures and converting them into an expression that achieves the application behavior at runtime. The expression generated may be dynamically evaluated at runtime of the component. The expression may be a line of code, it may be a formula in a macro language, or it may be a function call. The expression may be in a managed language such as JAVA, C #, Python, Perl, or any other language with managed memory or managed runtime. Equally, the expression may be in an unmanaged language such as C or C++.

Visual cue generator 128 exposes the formula, data dependencies, and relevant design controls using visual cues. Visual cues may be any visual indicator, such as, without limitation, a highlight, an animation, a border, a color, or any other suitable visual indicator. For example, visual cue generator 128 may provide target indicators 130, which hint to user 104 the relevant controls or components based on user selection of another component. In this example, target indicators 130 may be a highlight or border around target controls based on a selected control, such as highlighting target data based on a selected data pane control, textual display of parameters within the expression in different color fonts, or any other suitable visual cue, for example. The visual cue of the target indicators 130 guides the gesture interaction as expression generator 126 interprets the received gestures to generate the expression used for application behavior. As gestures are performed, the target may light up or receives a border decoration to confirm its participation in the automatically generated application behavior, for example. A corresponding parameter added to the expression as a result of user selection of a target may be visually presented in the same color as the target indicator, such as a red border box around the selected target and the corresponding parameter in the formula bar presented in red text, for example.

In one exemplary illustration, the visual cue may be a border decoration similar to the colorized border visual cue in a spreadsheet application, which visually ties a cell of the spreadsheet to a part of a formula in a function field to which it pertains. In this illustration, the corresponding colorization is maintained between the parameter or portion of the expression in the expression field and the control or component at the design surface, providing visualization of the contributing components to the application behavior, and specifically the parameter of the expression that is tied to a particular component or portion of a component.

Figure 2:
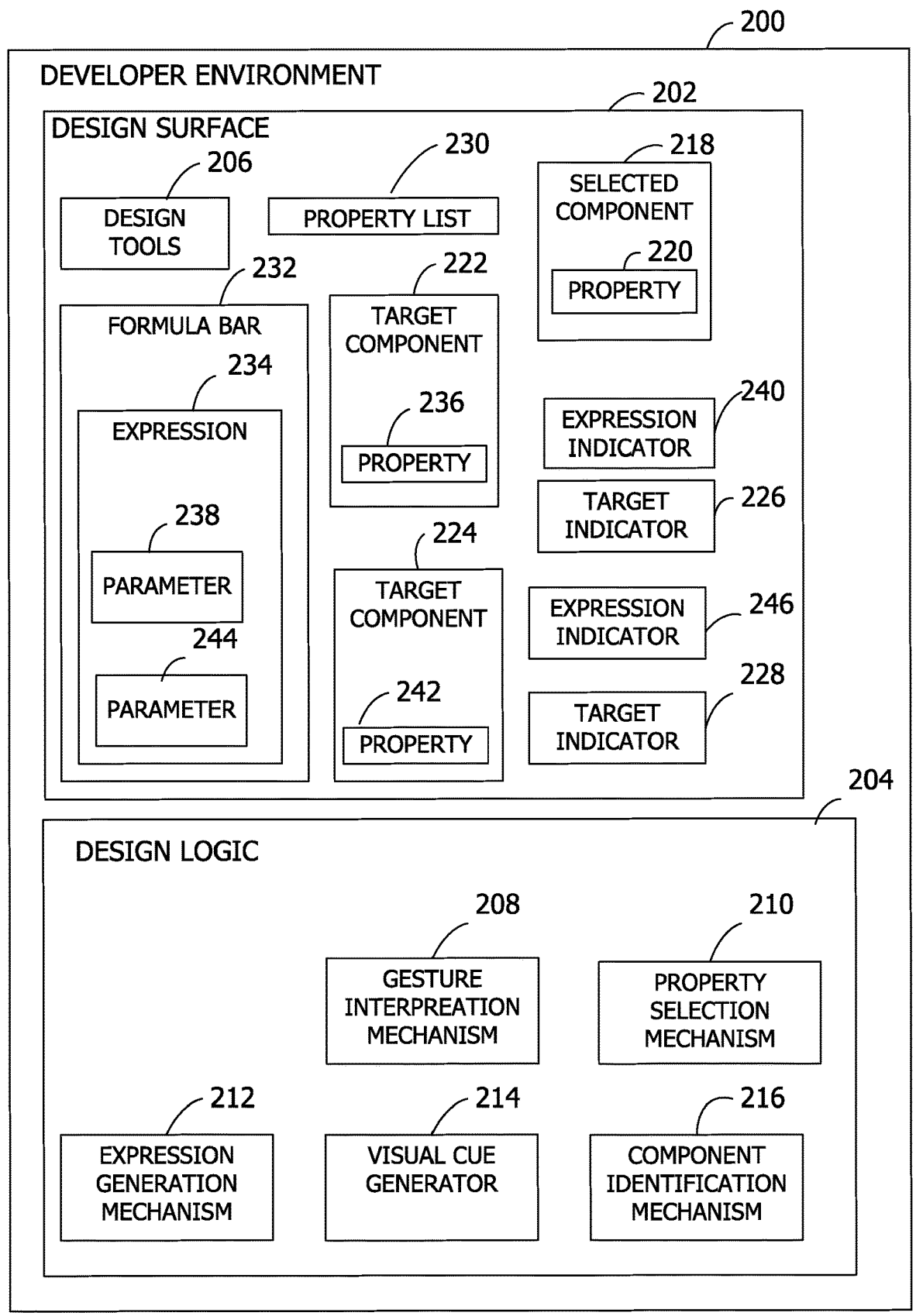
FIG. 2 is an exemplary block diagram illustrating a developer environment for generating application behaviors.

FIG. 2 is an exemplary block diagram illustrating a developer environment for generating application behaviors. Developer environment 200 is an illustrative example of one implementation of developer environment 110 in FIG. 1. Developer environment 200 includes design surface 202 and design logic 204.

Design surface 202 may be an interactive canvas for receiving components, gestures, and interactions with components, which are used by design logic 204 to automatically generate application behavior. For example, design surface 202 may be a portion of developer environment 200 that is displayed via a user interface and is configured to receive user interaction. Design surface 202 may include design tools 206, which may be application resources of developer environment 200. For example, design tools 206 may include component library 118 of FIG. 1.

Design logic 204 may include a number of algorithms, rules, and parameters for automatically generating application behavior using gestures corresponding to components and interactions with components. For example, design logic 204 may include, without limitation, gesture interpretation mechanism 208, property selection mechanism 210, expression generation mechanism 212, visual cue generator 214, and component identification mechanism 216.

In an exemplary operation, design surface 202 may receive a component selection, as illustrated by selected component 218. Selected component 218 may be a single control or a set of controls, such as a set of labels for example. Selected component 218 may have property 220, which may be a default property determined by property selection mechanism 210 as the best match property to tie to the expression being generated by expression generation mechanism 212 based on a context identified by property selection mechanism 210, for example. As one illustrative example, selected component 218 may be a background of a page or screen of an application being designed, and property 220 may be a fill color corresponding to the background of the page. As another example, selected component 218 may be a set of pages or set of screens of an application, and property 220 may be a fill color corresponding to the background of each screen.

Based on the selection of selected component 218, component identification mechanism 216 determines relevant components as targets for creating application behavior. In this exemplary illustration, target component 222 and target component 224 may be relevant components to selected component 218. A relevant component may be any component or control that has a corresponding or compatible property type, in some examples, or a compatible data dependency in other examples. In some examples, visual cue generator 214 may provide target indicator 226 proximate to target component 222 and target indicator 228 proximate to target component 224 to visually provide an indication of target components to guide further selection and gesture interaction with design surface 202. Target indicator 226 and target indicator 228 may be, for example, a highlight or border around their corresponding target components, or an animation such as a flashing border around the corresponding target components. In other examples, visual cue generator 214 may provide target indicators by visually muting or graying out components that are not targets, such that only the identified target components are selectable.

Design surface 202 may detect a selection of a target component, or a selection of at least a portion of a target component, such as target component 222 for example. Based on the selection, property selection mechanism 210 may determine a property of the selected target component, or the selected portion of the target component, to use in the expression being generated. Property selection mechanism 210 may determine a default property for the target component based on a current design context. Property selection mechanism 210 may also provide an interactive list of properties of the selected target control, such as property list 230, for optional user selection of a property other than the default property. Property list 230 may be displayed proximate to formula bar 232, where expression 234 may be dynamically displayed during expression generation, for example. In some examples, property selection mechanism 210 determines property 236 for target component 222, as the first selected target component, and provides property 236 to expression generation mechanism 212. In other examples, property selection mechanism 210 receives a selection of a second property from property list 230 and provides the selection of the second property to the expression generation mechanism for generating the expression. Expression generation mechanism 212 uses the selected target component 222 and property 236 to begin creating expression 234 to change property 220 of selected component 218 based on property 236 of target component 222. Parameter 238 of expression 234 corresponds to property 236 of target component 222, where target component 222 may represent a first target component and property 236 may represent a first property of the first target component.

In another example, a portion of target component 222 may be selected, and property 236 may be determined for the selected portion of target component 222, with parameter 238 corresponding to property 236 for the selected portion of the target component.

Visual cue generator 214 may also provide visual indicators of relationships between parameters of the expression and components at the design surface. For example, visual cue generator 214 may provide an indicator to visually tie parameter 238 to target component 222, or to visually indicate a relationship between parameter 238 and target component 222, such as expression indicator 240. Expression indicator 240 may be proximate to target component 222 to visually associate target component 222 to parameter 238 within expression 234. For example, expression indicator 240 may be a colorized border box around target component 222 in a first color, with the text of parameter 238 visually appearing in the same first color as the border box around target component 222, visually associating parameter 238 with target component 222. In an illustrative scenario where a portion of a target component is selected, visual cue generator 214 may visually tie parameter 238 to the selected portion, such as with a colorized border box around the selected portion of the target component, in some examples.

A second target component 224, or a portion of target component 224, may also be selected, with a second property 242 to use in expression 234 as parameter 244. Selection of a second target component, or second portion of a target component, may cause the expression generation mechanism to modify expression 234 based on the addition of the second parameter. Additionally, a second visual indicator may be provided, such as expression indicator 246, to visually tie parameter 244 to target component 224, for example. Any number of components may be bound or wired to generate an application behavior, the example of one or two target components is provided for illustrative purposes only to demonstrate the automatic generation of application behavior from gestures detected that select components or properties for the expression.

Figure 3:
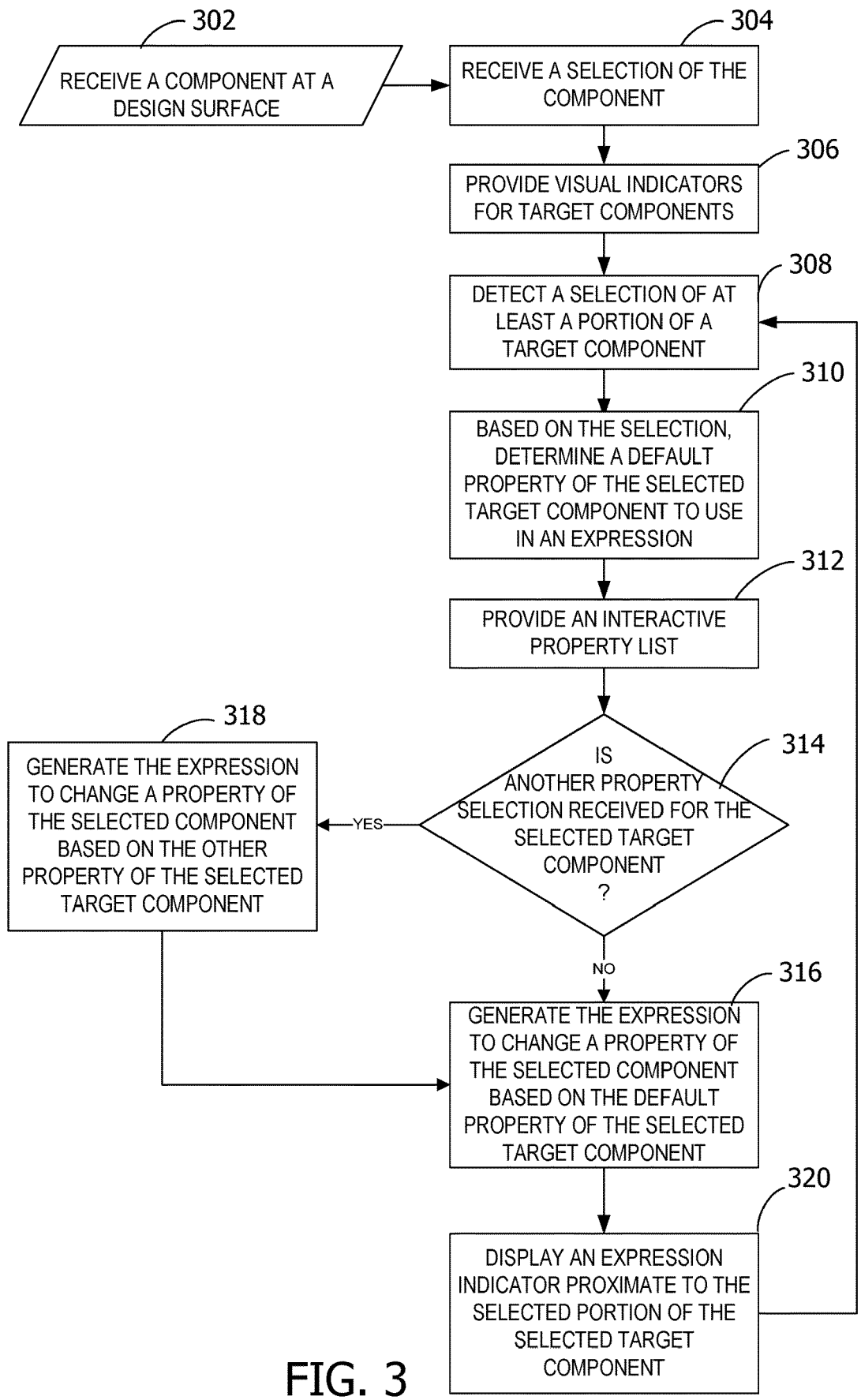
FIG. 3 is an exemplary flow chart illustrating operation of the computing device to generate an expression.

FIG. 3 is an exemplary flow chart illustrating operation of the computing device to generate an expression. The exemplary operations presented in FIG. 3 may be performed by one or more components described in FIG. 1 or FIG. 2, for example.

The process begins by receiving a component at a design surface at operation 302. The component may be received by user selection of a component from a component library, for example, or dragging and dropping a representation of a control from a control bar to a design surface, as another example. The component or control may represent an object or entity at runtime of the application being designed.

The process receives a selection of the component at operation 304. The selection of the component may be detected based on one or more gestures. Gestures, as described herein, may include, without limitation, a click, double-click, tap, drag and drop, pinch, swipe, expand, merge, or any other gesture that may be detected and interpreted in association with a control or component at the design surface.

The process provides visual indicators for target components at operation 306. The visual indicators may be generated by visual cue generator 214 of FIG. 2, for example. The visual indicators may guide detection of one or more target components, or one or more portions of a target component, for example. The process detects a selection of at least a portion of a first target component at operation 308. The selection detected may be from a gesture, such as a tap on the target component for example.

The process detects a selection of at least a portion of a target component at operation 308. The portion may be the entire target component, a selection of the target component as a whole, or a selection of a portion or sub-set of the target component. For example, a slider bar component may be selected as a target component, or a portion of the slider bar component may be selected, such as the moveable indicator portion of the slider bar control. Based on the selection, the process determines a default property of the selected target component to use in an expression at operation 310. The process provides an interactive property list at operation 312. The interactive property list may be displayed at a design surface with the default property at the top, or highlighted, or otherwise indicating default selection of the default property to provide visual information of both the available properties of the selected target component and the default property that will be used if another selection is not made. The interactive list may be displayed as a drop down list proximate to the field where the expression is visually displayed, for example.

The process determines whether another property selection is received for the selected target component at operation 314. Another property selection may be made by selection of a property other than the default property from the interactive property list, for example. If the process determines that another property selection is not received, the process generates the expression to change a property of the selected component based on the default property of the selected target component at operation 316. If the process determines that another property selection is received, the process generates the expression to change a property of the selected component based on the other selected property of the selected target component at operation 318.

The process displays an expression indicator proximate to the selected portion of the selected target component at operation 320, with the process optionally returning to operation 308 to iteratively detect interaction with additional target components until a desired application behavior is generated.

Figure 4:
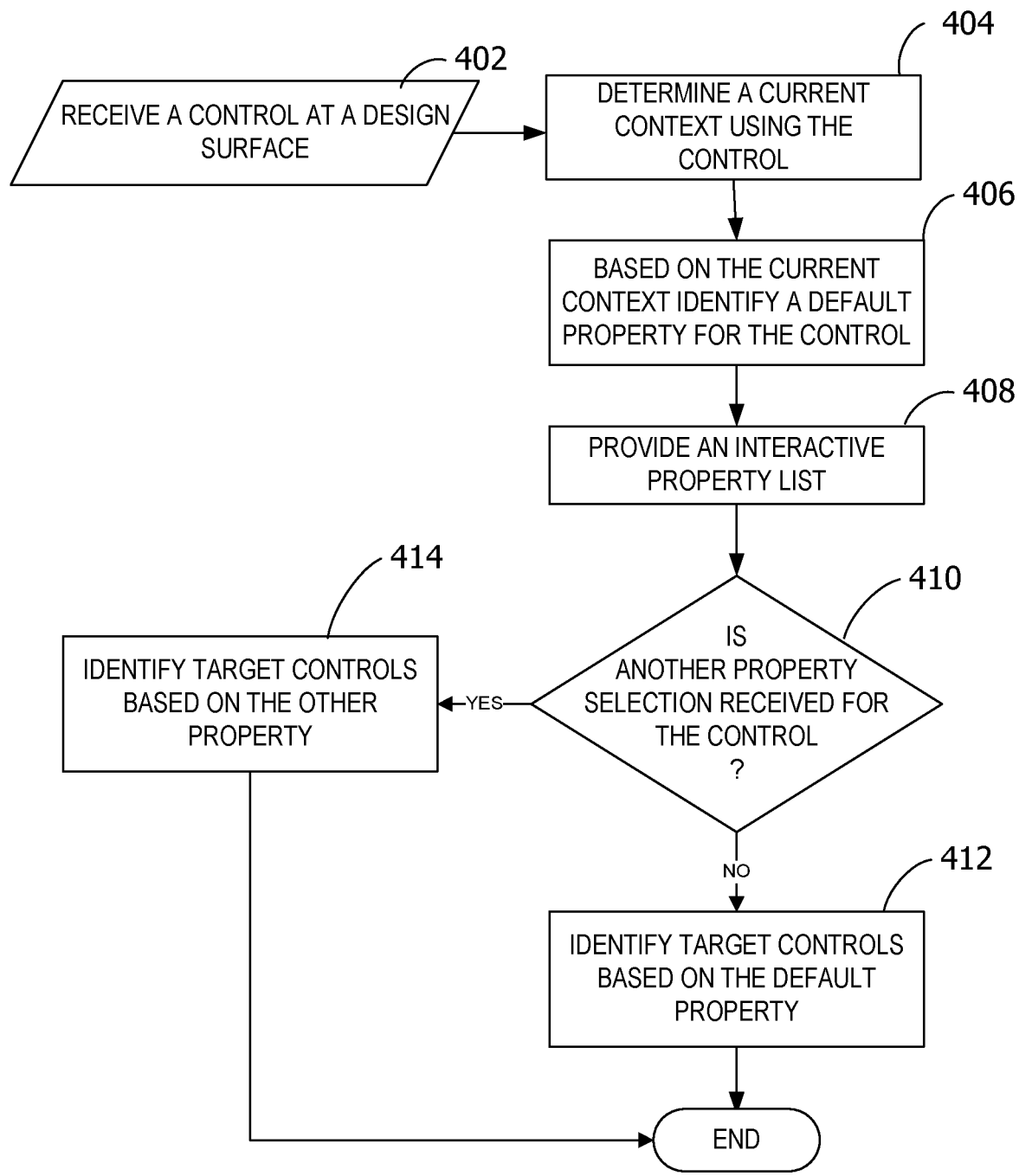
FIG. 4 is an exemplary flow chart illustrating operation of the computing device to identify target controls.

FIG. 4 is an exemplary flow chart illustrating operation of the computing device to identify target controls. The exemplary operations presented in FIG. 4 may be performed by one or more components described in FIG. 1 or FIG. 2, for example.

The process begins by receiving a control at a design surface at operation 402. The control may be received by a user selecting the control and placing it onto a design canvas of the design surface, for example, through a gesture such as a tap to select or a drag and drop of the control onto the canvas for inclusion into the application design.

The process determines a current context using the control at operation 404. Based on the control received and the properties of that control, for example, the process may determine user intent for the control in the current application design. In some examples, the user intent may be determined in part based on past user interactions with the designer or past user selections corresponding to the received control. The user intent may be inferred by data on past user selections or interactions via data collected through application analytics in association with the user profile. In other examples, the user intent may be determined based on telemetry, the best match for the control received, the available properties, and/or the other parameters, selections, and controls used in the current application design.

Based on the current context, the process identifies a default property for the control at operation 406. The default property may be determined based on similar heuristics as those used to determine context, for example, such as determining user intent for the control based on the identified design context. The process may provide an interactive property list at operation 408. The interactive property list may include the properties corresponding to the received control, where a control may have one or more properties. In some examples, the default property may be highlighted, placed at the top of the property list, or otherwise visually indicated as the default selection.

The process determines if another property selection is received for the control at operation 410. While the default property may be the automatic selection, the interactive property list provides for user selection of another property corresponding to the control, if the user intent differs from the determined default property for example.

If the process determines that another property is not selected, the process then identifies target controls based on the default property at operation 412. The target controls may be controls corresponding to or otherwise compatible with the default property of the received control. For example, if a received control is a component having a fill property, a target control may be a component indicating a color value. The process may use property type to determine a match between the first control's property to be set in an expression, and the property of the target control to be used. For example, if the first control has a property with a property type of a string, the process may only consider properties of the target control that are also of type string to use in the formula. This will also vary based on the formula used.

If the process determines that another property is selected, the process identifies target controls based on the other property at operation 414. The identified target controls may then be visually indicated as selectable, as described in further detail below.

Figure 5:
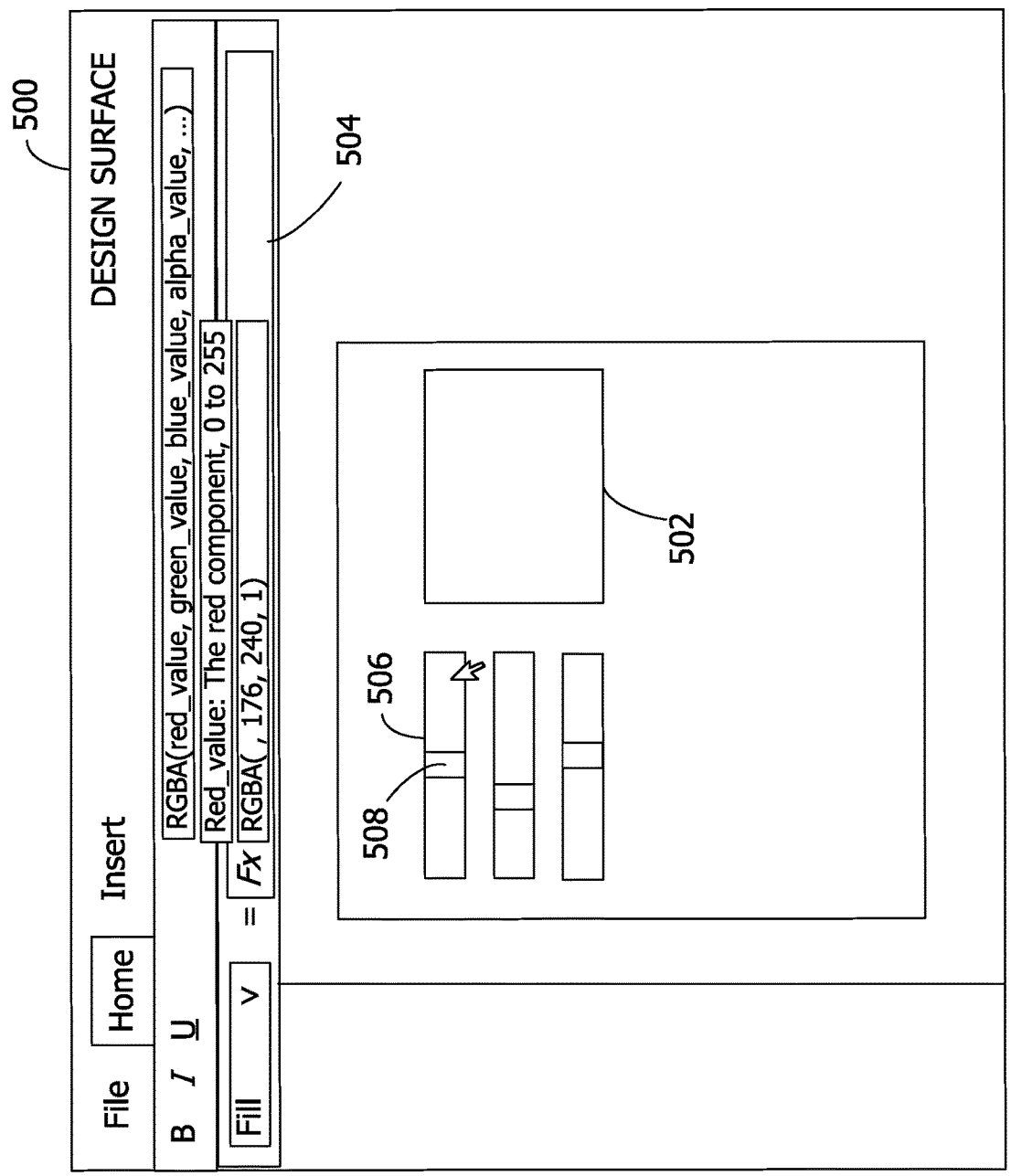
FIG. 5 is an exemplary diagram illustrating an interactive design surface.

FIG. 5 is an exemplary diagram illustrating an interactive design surface, such as design surface 202 in FIG. 2. Design surface 500 may be an illustrative example of a graphical user interface displaying developer environment, for example.

Selected component 502 may include a fill color property, and the expression automatically generated and displayed in formula bar 504 may be created to control the fill color property of selected component 502, for example. Target component 506 may be a slider control having a red_value property, with the value associated with the location of rail 508. In this example, the location of rail 508 determines the red_value property for target component 506, and the expression generated ties the red_value property of target component 506 to the RGBA (Red Green Blue Alpha) fill color of selected component 502, such that the expression generated causes the property of target component 506 to change the property of selected component 502.

In this example, when target component 506 is selected, target component 506 may receive a visual cue proximate to target component 506, such as a colorized border around target component 506. The same color used in the visual cue proximate to target component 506 may be used as the text color for the red_value parameter in the expression displayed in formula bar 504. This may visually tie the parameter in the expression to the corresponding component on the design surface. In other words, a visual cue representing the wiring between the components and the automatically generated expression.

Figure 6:
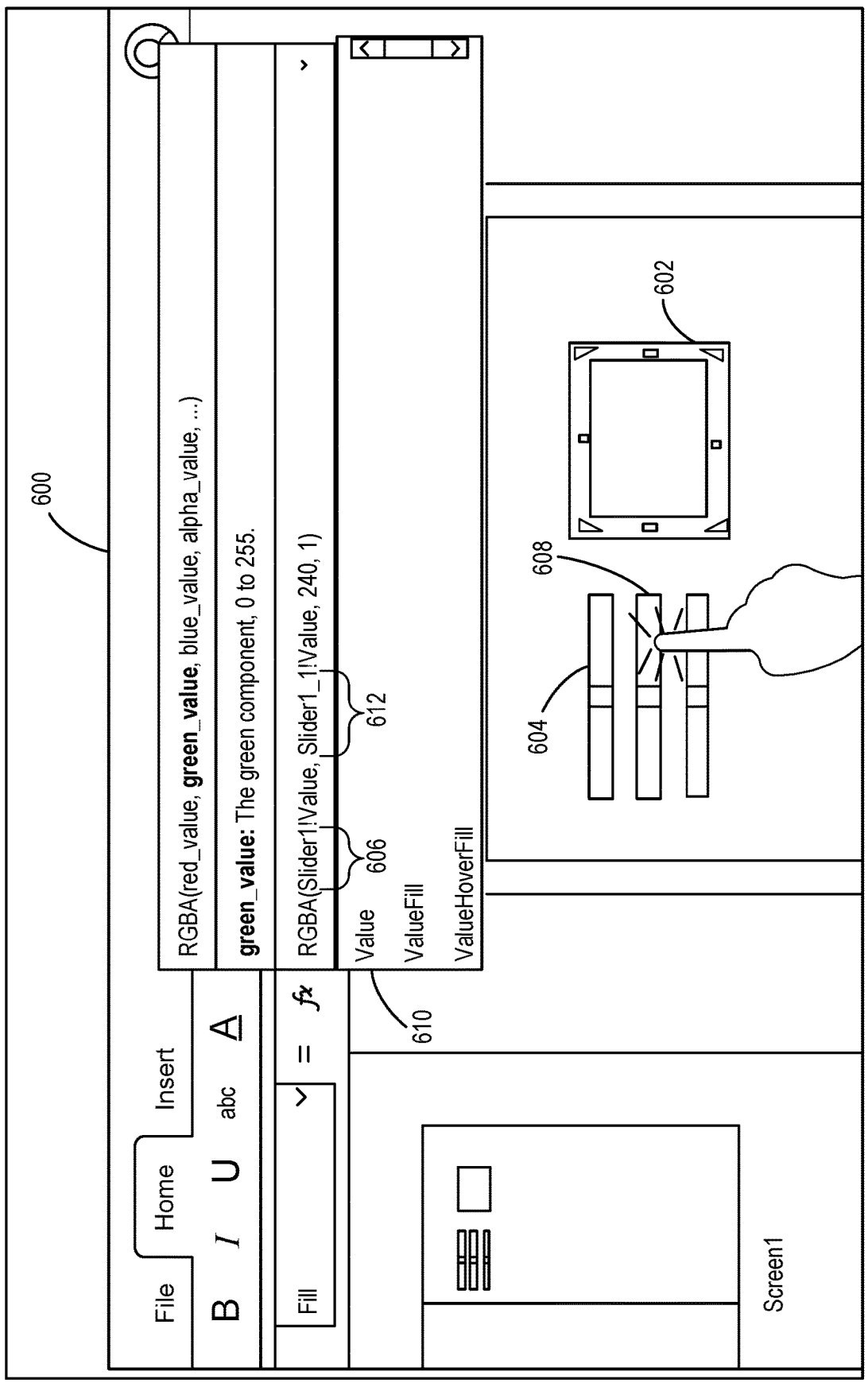
FIG. 6 is an exemplary diagram illustrating an interactive property list.

FIG. 6 is an exemplary diagram illustrating a design surface having an interactive property list. The interactive property list may be an illustrative example of property list 230 in FIG. 2.

Design surface 600 illustrates a user experience where an expression is dynamically generated via gestures associated with components at the design surface, with visual cues exposing the formula for the application behavior being generated. In this exemplary illustration, selected component 602 is indicated by a visual cue bordering the selected component. First target component 604 has been selected and visually tied to a parameter 606 in the expression displayed in the expression field. For example, a red border box may surround first target component 604, and the text or font color for parameter 606 may also be red, providing a visual cue that first target component 604 is tied to parameter 606 of the expression.

A gesture is received at a second target component and the gesture is interpreted as a selection of a second target component 608 for the selected component 602. An interactive property list 610 is provided proximate to the expression being generated, such as a drop down menu under the expression field, in this illustrative example. The interactive property list 610 indicates the different properties of second target component 608. The default property selected by or determined by the property selection mechanism may be the first property listed, in this example "Value" with other properties listed below. The second target component 608 is also visually tied to parameter 612 of the expression, for example with a purple border box surrounding second target component 608 and the text or font color in purple for parameter 612.

A selection of another property from interactive property list 610 may modify the expression to include another parameter, in some examples. In other examples, at least a portion of a target component may be selected, and the interactive property list may provide properties corresponding to the selected portion of the target component. As illustrated in design surface 600, the first property of the first target component 604 and the second property of the second target component 608 are parameters in the expression. The first property and the second property may be displayed as arguments in the expression, in some examples.

Figure 7A:
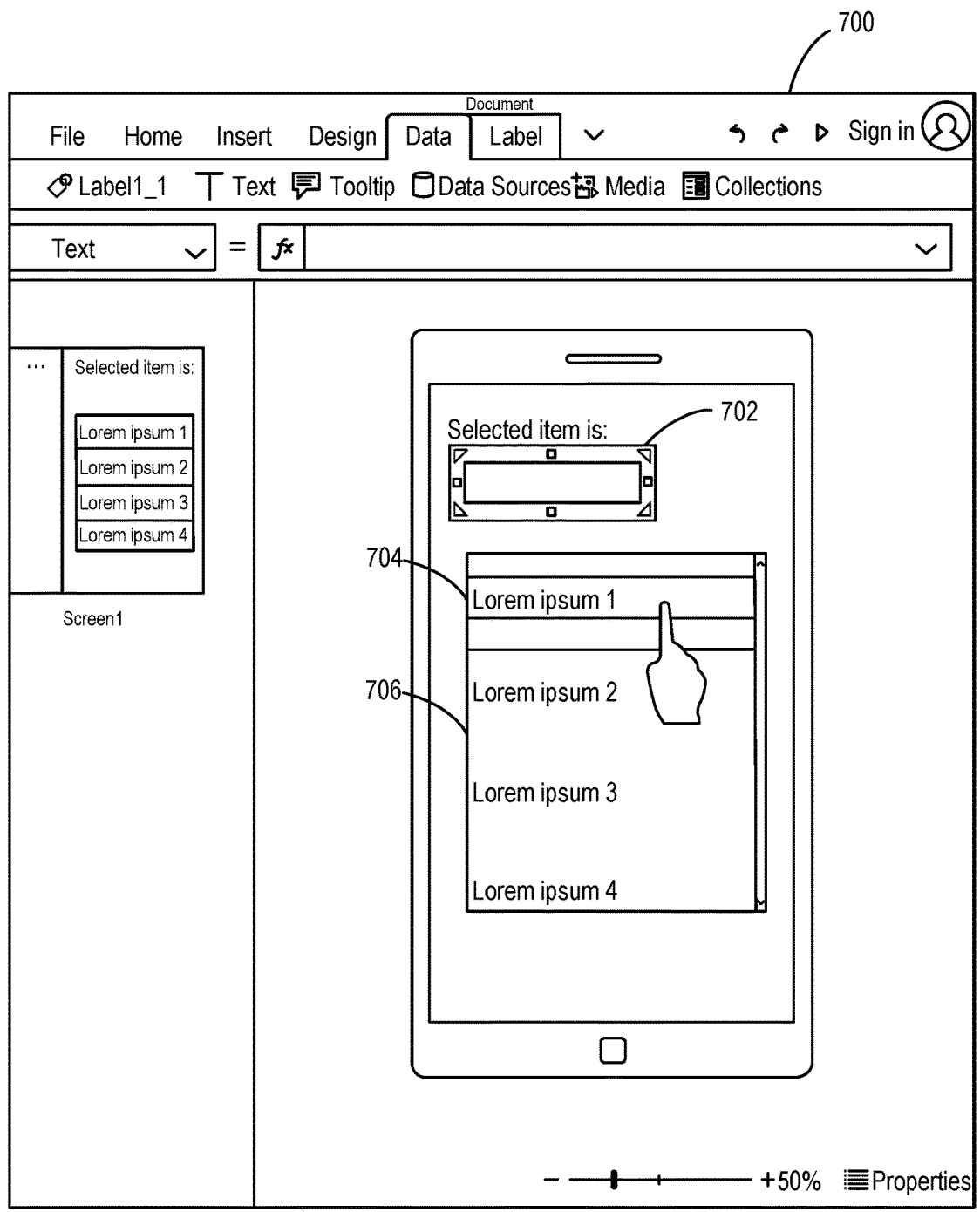
FIGS. 7A and 7B are exemplary diagrams illustrating expression generation using contextual gesture interpretation.
Figure 7B:
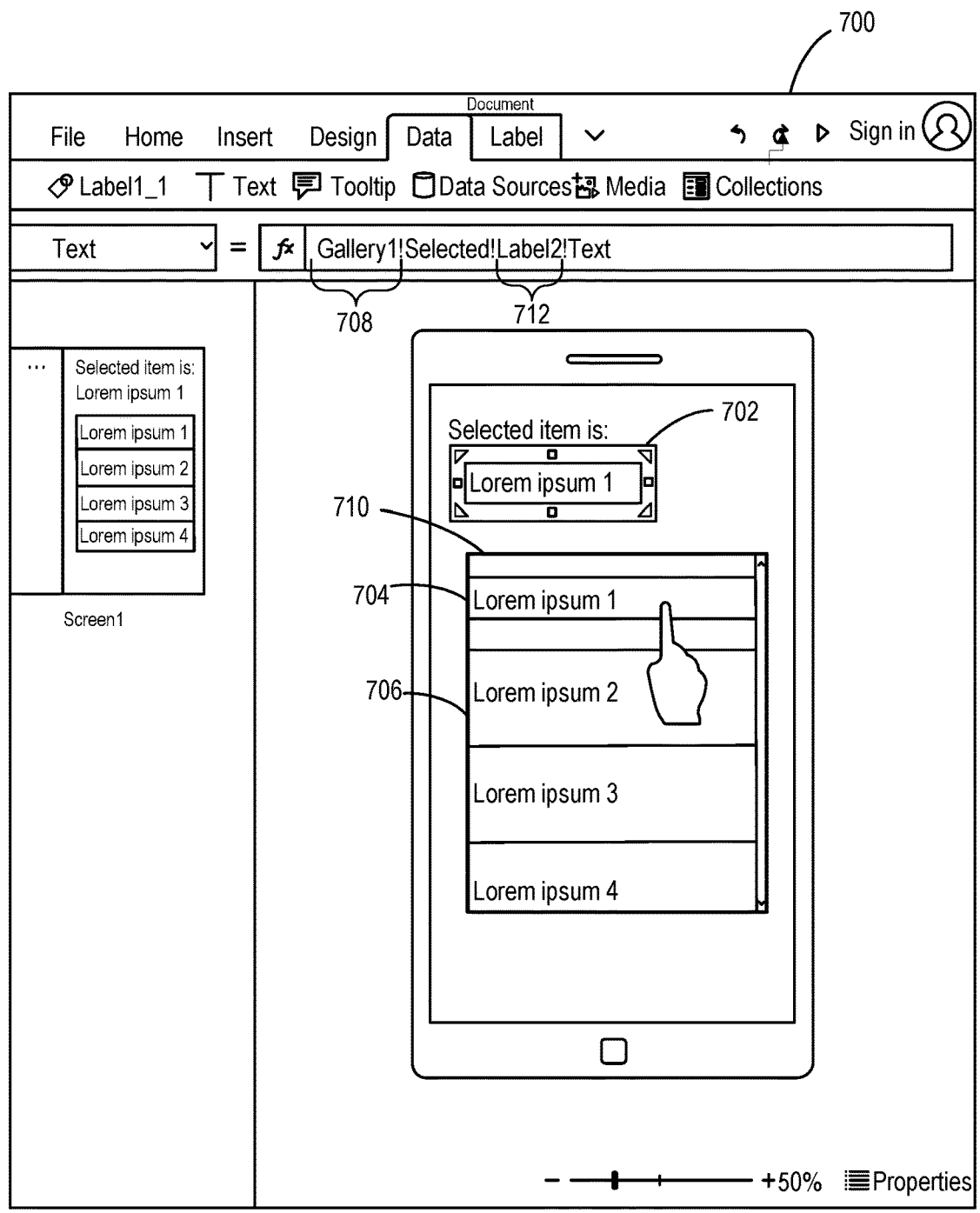

FIG. 7A and FIG. 7B depict an exemplary diagram illustrating expression generation using contextual gesture interpretation. Design surface 700 illustrates a component before and after a target selection and the resulting automatically generated expression. Designer intent or user intent is factored into the expression generation mechanism to achieve action-based application behavior in this illustrative example.

Selected component 702 may be a control within an end-user actionable control, such as a list that supports selection in this illustrative example, or a status label associated with a container of selectable items. A tap gesture on a desired target 704 within the list is interpreted as a user intent to bind the status label to the end-user actionable control. This wiring of the status label to the end-user actionable control generates an application behavior that reacts to a selection within a list rather than statically referring to just one item, such that an end-user gesture at runtime (a tap on an item within the list) causes the application to display the selection in the status label. In this example, selection of target 704 may generate an expression that displays the text of target 704 within the text box of selected component 702. As illustrated in the exemplary expression field at FIG. 7B, an expression is automatically generated based on the gesture selecting target 704, binding the gallery selection to the text presented in label control, selected component 702 in this example. A selection of target 706 at runtime would cause the text of target 706 to be displayed within the text box of selected component 702, because the application behavior generated factored in the user intent of a status label to reflect a current selection from a list of selectable items, for example.

Visual cues are provided at design surface 700 to expose the wiring occurring as gestures or user selection is received. In this example, the first parameter 708 in the automatically generated expression is associated with a first visual indicator that ties the first parameter 708 to the gallery control 710. The first visual indicator may be a color, for example, such as a red border box around gallery control 710 and corresponding red text for the first parameter 708 in the expression field. A selection of target 704 modifies the expression to add second parameter 712, which may be visually tied to target 704 with a second visual indicator different from the first visual indicator, such as a different color for example. In this illustration, target 704 may have a purple border box after selection, with the second parameter 712 displayed in purple text in the modified expression. The visual indicators expose the formula automatically created by component selection to a user, allowing a user to design application behaviors using gestures while bypassing textual input of code.

Figure 8A:
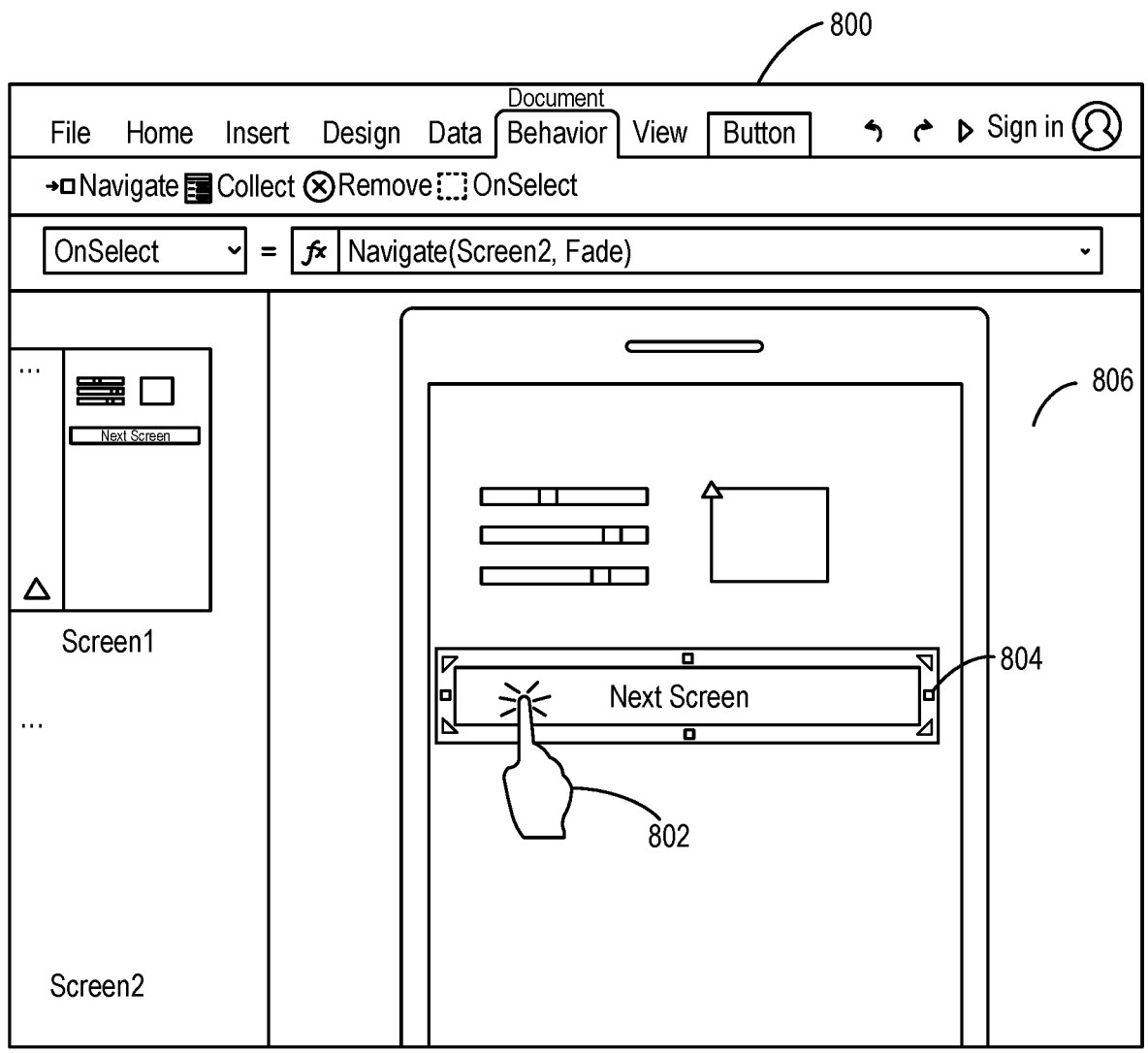
FIGS. 8A and 8B are exemplary diagrams illustrating a target mode of a design surface.
Figure 8B:
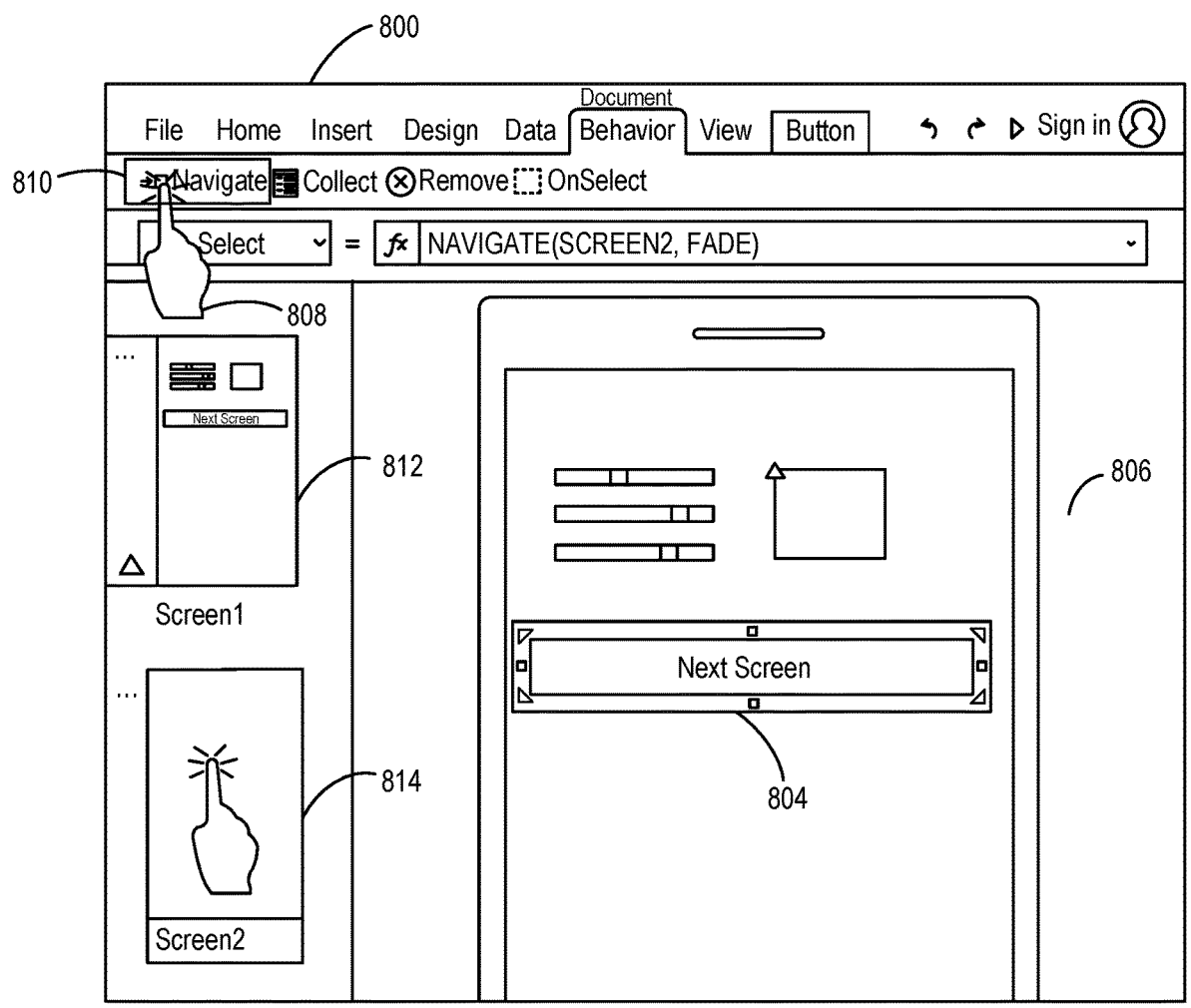

FIG. 8A and FIG. 8B depict an exemplary diagram illustrating a target mode. A target mode may refer to a mode of a designer, such as developer environment 110 in FIG. 1, where targets are selectable and non-targets are not selectable, or where areas having selectable targets are available for interaction and other areas are not available for interaction. In some examples, a component selection may trigger a target mode, such that target components based on the component selection are highlighted or otherwise visually indicated as selectable targets, with other areas of a design surface muted or grayed out or otherwise visually indicated as areas without targets. Valid target indicators provide visual cues of selectable target components based on the selected component. In other example, an application behavior selection may trigger a target mode, such that target components compatible with the selected application behavior are visually indicated as selectable targets.

In this illustrative example, as depicted at FIG. 8A, design surface 800 illustrates user selection 802 of a component 804 on design canvas 806. In this illustrative example, component 804 may be a selected by a user gestures, such as a tap or click, which may indicate user intent to wire a behavior to component 804.

FIG. 8B depicts user selection 808 of a navigation behavior 810. Design surface 800 receives user selection 808, and may infer user intent to wire navigation behavior 810 to selected component 804. As a result of the inference to wire the behavior to the selected control, design surface visually indicates selectable targets 812 and 814, which may be highlighted or otherwise visually cued to guide selection, in some examples. In other examples, design surface 800 may visually indicate selectable targets by graying out or visually muting non-selectable areas of design canvas 806. In this example, screen thumbnails may be the target entities or target components for navigation behavior 810 corresponding to selected component 804. The target mode of design surface 800 is one illustrative example of the visual cues that may guide a user or guide gesture interaction with a design surface to facilitate expression generation with valid targets.

Figure 9:
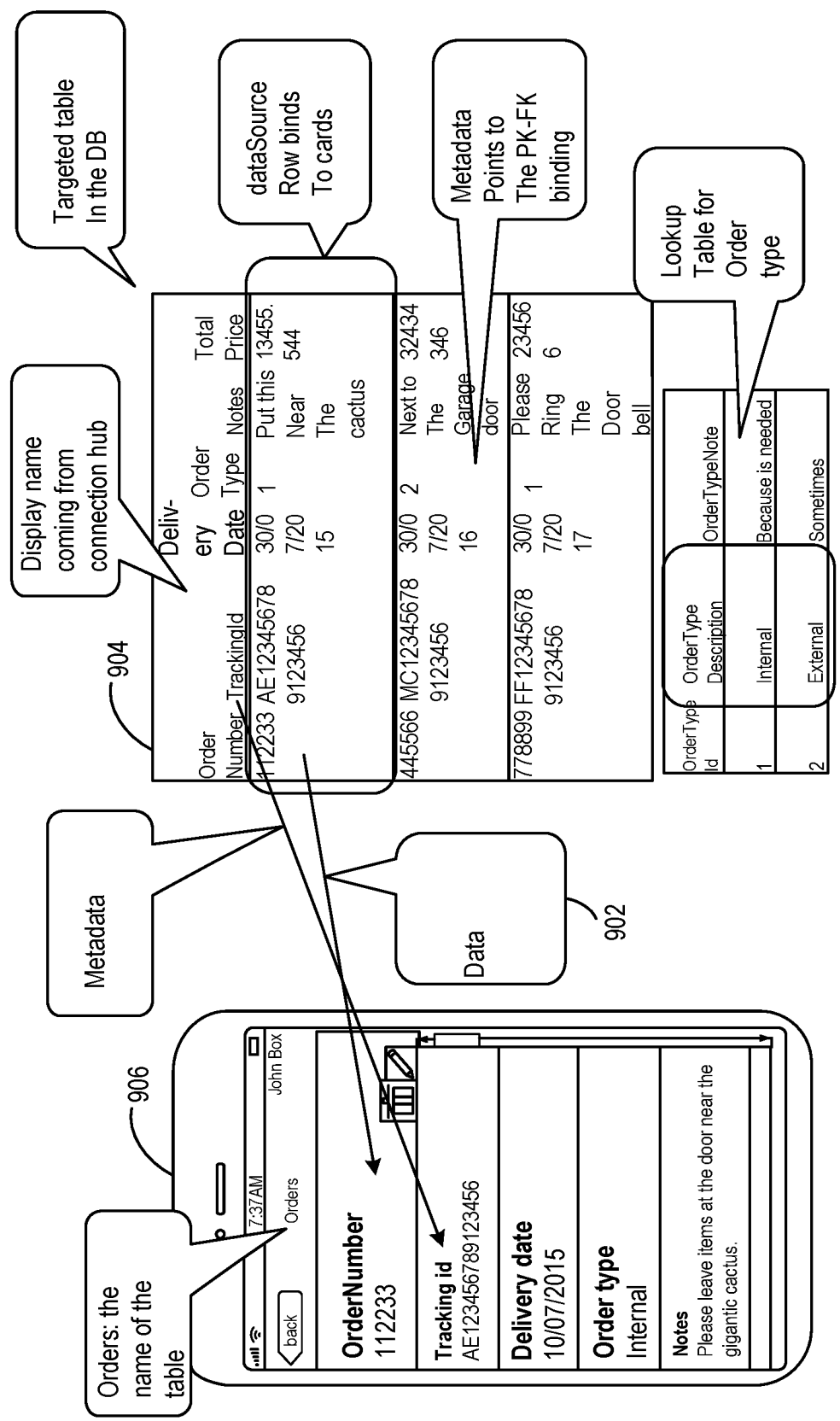
FIG. 9 is an exemplary diagram illustrating data binding using gestures directed to or corresponding to controls at a design surface.

FIG. 9 is an exemplary diagram illustrating data binding using gestures directed to or corresponding to controls at a design surface. In some examples, a drag and drop gesture may be used to drag data 902, such as an actual row of data, from a data preview 904 and drop them into fields of an application 906, to wire a data form to a specific table, or a data table to a gallery component for example. Metadata may also be wired in using gestures, such as drag and drop of column names from the data preview pane to the application data form, for example. The logic of loading, editing, and saving the data back to the database is code-generated automatically, generating the entire expression group from the gestures.

As one example, data may be visualized on the design surface, such as tables of data provided on the design surface, and different screens or pages of the application provided adjacent to the design surface as in FIG. 8B. A click on a gallery component on a screen, followed by a click on a table, may generate a formula to bind the gallery to the table, and more specifically to the data within the table. Metadata, such as a column name, may be bound to fields of the gallery. At design time, a user maps the data types from the table to fields of a gallery using clicks or gestures, for example, binding the table to the gallery so that at runtime the gallery is dynamically populated with the data from the table.

ADDITIONAL EXAMPLES

In some examples, a gesture may be used to code that gesture to animation behavior, such that when the gesture is detected in runtime the animation behavior occurs. For example, a swipe gesture may be detected at a design surface, with the swipe gesture directed at a page of the application. The expression generated may create an application behavior that codes the swipe gesture to a navigation behavior, so that at runtime a swipe gesture received on the page navigates to a next page, for example. A user may generate this application behavior using a gesture, without having to type in any code or even understand how the expression is formulated. In other words, gestures are used to create wiring between visual elements, expressed as a formula for application behavior.

In other examples, components may be animated and wired to a gesture, such as a label component wired to fade in to the display screen upon selection, or to fade out upon selection of another control. The expression automatically generates the animation function in response to a detected gesture during the design phase, interpreted based on context to determine user intent.

Context may also be determined based on telemetry or machine learning. In an example scenario, a default property for a selected component may be based upon machine learning from past user behavior, or based on telemetry for a new user. Additionally, repeated gestures of a same type may be interpreted as an indication that user intent is for a different selection, such as a repeated tap on a property list to rotate through property options, or a repeated click on a control to rotate through properties of the control, for example.

Alternatively or in addition to the other examples described herein, examples include any combination of the following:

displaying a first indicator proximate to the selected portion of the first target component, the first indicator providing a visual cue of the first property of the first target component used in the expression;

displaying a first indicator proximate to the selected portion of the first target component, the first indicator providing a visual cue of the first property of the first target component used in the expression;

wherein the property of the component is a parameter used in the expression;

wherein the parameter used in the expression is displayed in a first color, and the first indicator is also displayed in the first color;

providing an interactive list of properties of the first target component proximate to the expression;

receiving a selection of a second property from the interactive list;

generating the expression based on the selection of the second property;

wherein the component is a control and the first target component is another control on the design surface;

detecting a selection of at least a portion of a second target component;

determining a second property of the second target component to use in the expression;

modifying the expression to change the property of the component based on the first property of the first target component and the second property of the second target component;

wherein the first property and the second property are displayed as arguments in the expression;

wherein the first property used in the expression and the first indicator are displayed in a first color, and the second property used in the expression and the second indicator are displayed in a second color;

a visual cue generator coupled to the design surface and configured to display a first indicator proximate to the selected portion of the first target control, the first indicator providing a visual cue of the relationship between the first property of the first target control and a parameter used in the expression;

wherein the parameter used in the expression is displayed in a first color, and the first indicator is also displayed in the first color;

provide an interactive list of properties of the first target control proximate to the expression;

receive a selection of a second property from the interactive list;

provide the selection of the second property to the expression generation mechanism for generating the expression;

wherein the component identification mechanism is further configured to detect a selection of at least a portion of a second target control;

wherein the property selection mechanism is further configured to determine a second property of the selected portion of the second target control to use in the expression, and provide the second property to the expression generation mechanism to modify the expression to change the property of the selected control based on the first property and the second property;

displaying a first target indicator proximate to the selected portion of the first target component, the first target indicator providing a visual cue of the first property of the first target component used in the expression;

displaying a valid target indicator proximate to one or more valid target components, the valid target indicator providing a visual cue of other selectable components based on the received selection;

receiving, at a design surface, an object;

detecting a selection of the object;

determining a current design context for the selected object;

providing an object behavior for the selected object based on the current design context;

providing a list of object properties and corresponding object behaviors, including a default object behavior;

wherein the list of object properties is an ordered list based on machine learning, and wherein the default object behavior is based on the current design context for the selected object wherein the detected selection is based on a gesture;

wherein determining the current design context further comprises determining user intent relative to the selected object;

identifying one or more targets associated with the current design context for the selected object;

detecting a gesture directed towards a target;

interpreting the detected gesture based on the current design context and the selected object;

generating a formula based on the interpreted gesture, the formula binding the selected object and the target;

identifying a selected location within the expression;

determining a design context based on the selected location within the expression;

identifying an object type associated with the selected object;

identifying a property type associated with the selected object;

determining a design context based on the object type and the property type.

In some examples, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 10:
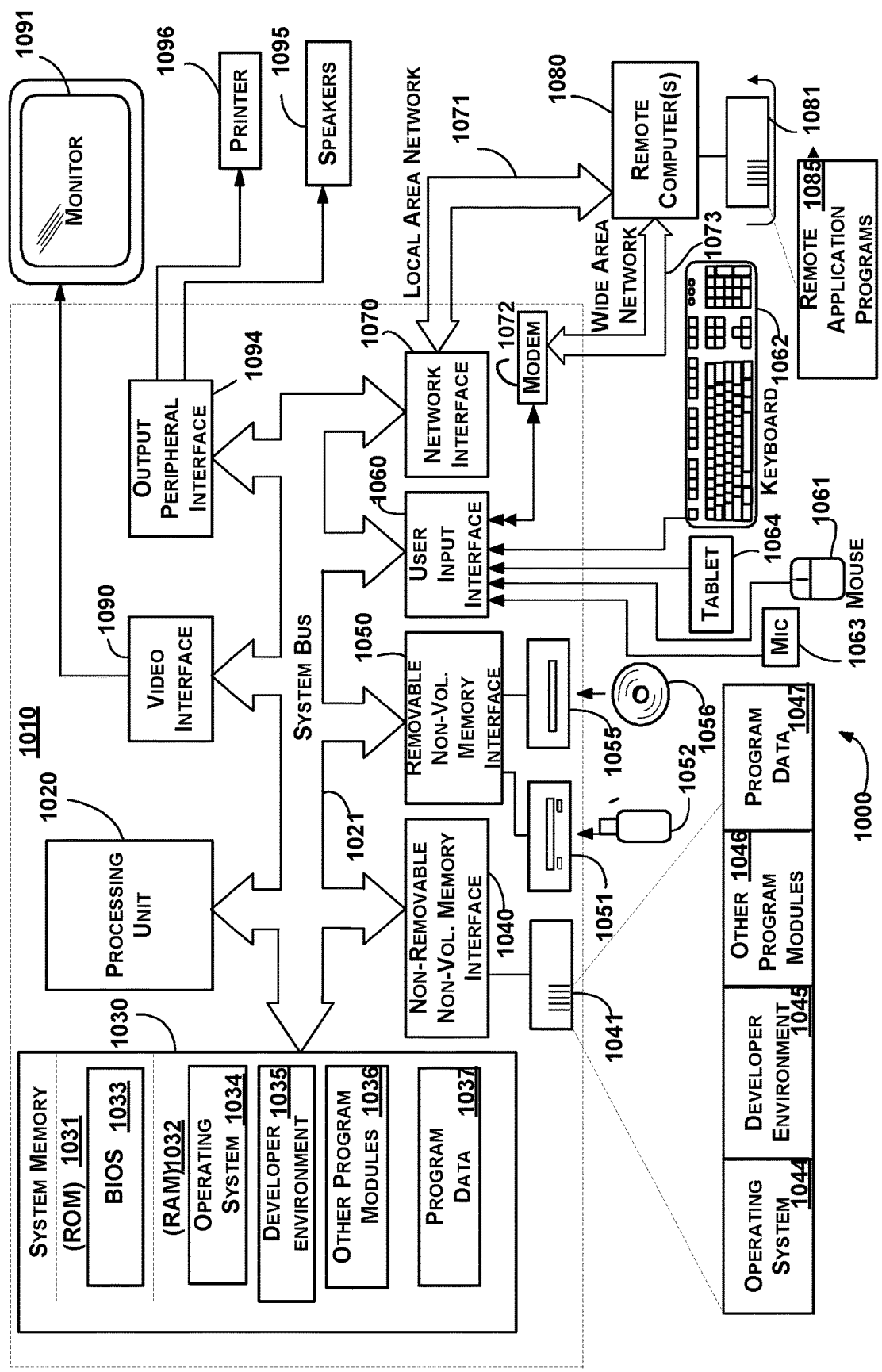
FIG. 10 is an exemplary block diagram illustrating an operating environment for a computing device implementing an audio routing component.

FIG. 10 illustrates an example of a suitable computing and networking environment 1000 on which the examples of FIG. 1 may be implemented. The computing system environment 1000 is only one example of a suitable computing environment and is not intended to suggest any limitation as to the scope of use or functionality of the disclosure. Neither should the computing environment 1000 be interpreted as having any dependency or requirement relating to any one or combination of components illustrated in the exemplary operating environment 1000.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 10, an exemplary system for implementing various aspects of the disclosure may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media may be any available media that may be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 1031 and 1032 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 1010. Computer storage media does not, however, include propagated signals. Rather, computer storage media excludes propagated signals. Any such computer storage media may be part of computer 1010.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs, such as developer environment 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a universal serial bus (USB) port 1051 that provides for reads from or writes to a removable, nonvolatile memory 1052, and an optical disk drive 1055 that reads from or writes to a removable, nonvolatile optical disk 1056 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and USB port 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, developer environment 1045, other program modules 1046 and program data 1047. Note that these components may either be the same as or different from operating system 1034, developer environment 1035, other program modules 1036, and program data 1037. Operating system 1044, developer environment 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel may be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

The examples illustrated and described herein as well as examples not specifically described herein but within the scope of aspects of the disclosure constitute exemplary means for generating application behavior via contextualized gestures. For example, the elements illustrated in FIG. 1 and FIG. 2, such as when encoded to perform the operations illustrated in FIG. 3, constitute exemplary means for receiving a selection of a component, exemplary means for detecting a selection of a target component, and exemplary means for determining a property of the target component and generating an expression to change a property of the selected component based on the property of the target component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for generating an expression representing runtime behavior of an application, the method comprising:
   detecting a selection of a first component in a design environment, wherein a component represents a user interface element of the application;
   identifying, by design logic, a current design context for the design environment, wherein the current design context is determined by a property selection mechanism using at least one of: a learned property of a control of the design environment, machine learning, and telemetry of a control of the design environment;
   identifying, based on the selection of the first component, a compatible property type or a compatible data type;
   detecting a selection of at least a portion of a second component as a target component, the selections available being limited based at least on:
   the selected first component, and the compatible property type or the compatible data type;
   based on the identified current design context and on the detected selection of the target component,
   determining a first property of the target component to use in the expression, the expression to be dynamically evaluated at runtime of the first component; and
   automatically generating, by the design logic, the expression to change a property of the first component based on the determined first property of the target component.

2. The method of claim 1, wherein identifying the current design context further comprises:

determining a current cursor location within the expression or partial expression displayed in a formula bar of the design environment.

3. The method of claim 1, wherein identifying the current design context further comprises:
determining a location of the expression or partial expression where a parameter is inserted or selected.

4. The method of claim 1, wherein identifying the current design context further comprises:
determining a dynamic property of at least one of the first component or the target component.

5. The method of claim 1, wherein identifying the current design context further comprises:
determining a learned property of at least one of the first component or the target component based on past user interaction or selection of the first component or the target component.

6. The method of claim 1, further comprising:
displaying a first indicator proximate to the second component, the first indicator providing a visual cue of the first property of the target component used in the expression.

7. The method of claim 6, wherein the first property of the target component is a parameter used in the expression.

8. The method of claim 6, further comprising:
providing an updated interactive list of properties of the target component proximate to the expression displayed in a formula bar of the design environment;
receiving a selection of a second property from the updated interactive list; and
modifying the expression based on the selection of the second property.

9. The method of claim 1, wherein the first component and the second component are application controls.

10. The method of claim 1, further comprising:
detecting another selection of at least a portion of another target component;
based on the detected selection of the portion of the other target component and the identified current design context, determining a second property of the other target component to use in the expression; and
modifying the expression to change the property of the first component based on the first property of the target component and the second property of the other target component.

11. The method of claim 10, wherein the first property is displayed as a first parameter and the second property is displayed as a second parameter of the expression.

12. The method of claim 1, wherein the first property of the target component is one of:
a default property of the target component based at least on the current design context, and
a user selected property that the user selected from an interactive list of properties that are compatible with the target component based at least on the current design context.

13. A system for generating an expression representing runtime behavior of an application, the system comprising:
a processor coupled to a memory;
a design environment implemented on the processor and configured to receive a first control and a second control;
a component identification mechanism coupled to the design environment and configured to detect a selection of at least a portion of the second control as a target component, the selections available being limited based at least on:
the first control, and
a compatible property type or a compatible data type;
a property selection mechanism coupled to the design environment and configured to:
identify a current design context, wherein the current design context is determined by a property selection mechanism using at least one of: a a learned property of a control of the design environment, machine learning, and telemetry of a control of the design environment,
identify, based on the first control, a compatible property type or a compatible data type, and
determine a first property of the target component to use in the expression of the second control, the expression to be dynamically evaluated at runtime of the first control; and
an expression generation mechanism coupled to the design environment and configured to generate the expression to change a property of the first control based on the determined first property of the target component.

14. The system of claim 13, further comprising:
a visual cue generator coupled to the design environment and configured to display a first indicator proximate to the target component, the first indicator providing a visual cue of a relationship between the first property of the second control and a parameter used in the expression.

15. The system of claim 13, wherein the property selection mechanism is further configured to:
provide an updated interactive list of properties of the second control proximate to the expression;
receive a selection of a second property from the updated interactive list; and
provide the selection of the second property to the expression generation mechanism for modifying the expression.

16. The system of claim 13, wherein the component identification mechanism is further configured to detect a selection of at least a portion of a third control.

17. The system of claim 16, wherein the property selection mechanism is further configured to determine a second property of the selected portion of the third control to use in the expression, and provide the second property to the expression generation mechanism to modify the expression to change the property of the first control based on the first property and the second property.

18. One or more computer storage devices having computer-executable instructions stored thereon for generating an expression representing runtime behavior of an application, which, on execution by a computer, cause the computer to perform operations comprising:
detecting a selection of a first component in a design environment, wherein a component represents a user interface element of an application; and
identifying, by design logic, a current design context for the design environment, wherein the current design context is determined by a property selection mechanism using at least one of:
a learned property of a control of the design environment, machine learning, and telemetry of a control of the design environment;
identifying, based on the selection of the first component, a compatible property type or a compatible data type;
detecting a selection of at least a portion of a second component as a target component, the selections available being limited based at least on:

the selected first component, and the compatible property type or the compatible data type;

based on the detected selection of the target component and the identified current design context, determining a first property of the target component to use in the expression, the expression to be dynamically evaluated at runtime of the first component, and automatically generating, by the design logic, the expression to change a property of the first component based on the determined first property of the target component.

19. The one or more computer storage devices of claim 18, having further computer-executable instructions which cause the computer to perform further operations comprising:

displaying a valid target indicator proximate to one or more valid target components, the valid target indicator providing a visual cue of other selectable components based on the detected selection of the first component.

20. The one or more computer storage devices of claim 19, having further computer-executable instructions which cause the computer to perform further operations comprising:

displaying a first target indicator proximate to the target component, the first target indicator providing a visual cue of the first property of the second component used in the expression.

* * * * *